US011003730B2

(12) United States Patent
Qiang et al.

(10) Patent No.: US 11,003,730 B2
(45) Date of Patent: May 11, 2021

(54) SYSTEMS AND METHODS FOR PARENT-CHILD RELATIONSHIP DETERMINATION FOR POINTS OF INTEREST

(71) Applicant: BEIJING DIDI INFINITY TECHNOLOGY AND DEVELOPMENT CO., LTD., Beijing (CN)

(72) Inventors: Chengcang Qiang, Beijing (CN); Hongguang Pan, Beijing (CN); Jingwen Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/102,448

(22) Filed: Nov. 24, 2020

(65) Prior Publication Data
US 2021/0081481 A1 Mar. 18, 2021

Related U.S. Application Data

(63) Continuation of application No. PCT/CN2018/088713, filed on May 28, 2018.

(51) Int. Cl.
*G06F 16/95* (2019.01)
*G06F 16/9537* (2019.01)
*G06F 16/29* (2019.01)
*G06F 16/9535* (2019.01)
*G06F 16/28* (2019.01)
(Continued)

(52) U.S. Cl.
CPC ........ *G06F 16/9537* (2019.01); *G06F 16/288* (2019.01); *G06F 16/29* (2019.01);
(Continued)

(58) Field of Classification Search
CPC . G06F 16/9537; G06F 16/288; G06F 16/9535
See application file for complete search history.

(56) References Cited

U.S. PATENT DOCUMENTS 6,542,817 B2  4/2003  Miyaki
8,176,034 B2  5/2012  Broadbent
(Continued)

FOREIGN PATENT DOCUMENTS

CN    104462155 A    3/2015
CN    103092964 B    3/2016
(Continued)

OTHER PUBLICATIONS

International Search Report in PCT/CN2018/088713 dated Feb. 26, 2019, 4 pages.
(Continued)

*Primary Examiner* — Loc Tran
(74) *Attorney, Agent, or Firm* — Metis IP LLC

(57) ABSTRACT

The present disclosure relates to systems and methods for determining parent-child relationships. The systems may obtain a first location name of a first point of interest (POI); perform a word segmentation operation on the first location to obtain a plurality of portions of the first location name; determine a first portion from the plurality of portions by comparing to a first portion name database, the first portion indicating that the first POI is a child POI; and determine a second POI based on a second portion of the first location name and that the second POI is a parent POI of the first POI.

15 Claims, 8 Drawing Sheets

(51) Int. Cl.
  *G06Q 50/30* (2012.01)
  *G06F 40/279* (2020.01)
  *G06Q 30/02* (2012.01)
  *G06Q 50/14* (2012.01)

(52) U.S. Cl.
  CPC ........ *G06F 16/9535* (2019.01); *G06F 40/279* (2020.01); *G06Q 30/0205* (2013.01); *G06Q 50/30* (2013.01); *G06Q 30/0284* (2013.01); *G06Q 50/14* (2013.01)

(56) References Cited

U.S. PATENT DOCUMENTS

| | | |
|---|---|---|
| 8,706,410 B2 | 4/2014 | Chowanic |
| 2010/0250536 A1 | 9/2010 | Broadbent |
| 2013/0275466 A1 | 10/2013 | Xiao |
| 2014/0164415 A1 | 6/2014 | Duleba |
| 2016/0234648 A1* | 8/2016 | Letz .................... H04L 67/1095 |
| 2019/0052995 A1* | 2/2019 | Agrawal ................ H04W 8/18 |

FOREIGN PATENT DOCUMENTS

| | | |
|---|---|---|
| CN | 106649464 A | 5/2017 |
| CN | 107133263 A | 9/2017 |
| CN | 107609186 A | 1/2018 |

OTHER PUBLICATIONS

Written Opinion in PCT/CN2018/088713 dated Feb. 26, 2019, 4 pages.

* cited by examiner

SYSTEMS AND METHODS FOR PARENT-CHILD RELATIONSHIP DETERMINATION FOR POINTS OF INTEREST

CROSS-REFERENCE TO RELATED APPLICATIONS

This application is a continuation of International Application No. PCT/CN2018/088713 filed on May 28, 2018, the entire contents of which are hereby incorporated by reference.

TECHNICAL FIELD

The present disclosure generally relates to systems and methods for online to offline transportation services, and in particular, to systems and methods for determining a destination based on parent-child relationships between points of interest (POIs).

BACKGROUND

Online to offline transportation services utilizing Internet technology, such as online taxi services, have become increasingly popular because of their convenience. However, a destination input by a user is usually an area of interest (AOI) rather than a specific point location. The relatively large area of an AOI would lower the precision of a navigation, makes it more difficult to pick up the passenger, and/or affect the estimated price of the trip as the estimated price is determined based on the input destination. Accordingly, it would be desirable to provide systems and methods for determining a destination based on parent-child relationships between points of interest (POIs). In addition, it would be desirable to provide systems and methods to establish the parent-child relationships between the POIs for later use.

SUMMARY

According to an aspect of the present disclosure, a system is provided. The system may include at least one storage medium and at least one processor in communication with the at least one storage medium. The at least one storage medium may include a set of instructions for determining parent-child relationships. When the at least one processor executes the set of instructions, the at least one processor may be directed to perform one or more of the following operations. The at least one processor may obtain a first location name of a first point of interest (POI). The at least one processor may perform a word segmentation operation on the first location to obtain a plurality of portions of the first location name. The at least one processor may determine a first portion from the plurality of portions by comparing to a first portion name database, the first portion indicating that the first POI is a child POI. The at least one processor may determine a second POI based on a second portion of the first location name and that the second POI is a parent POI of the first POI.

In some embodiments, the first location name may be derived by pre-processing an input location name of the first POI.

In some embodiments, the plurality of driving track points may be obtained based on position information associated with a plurality of vehicles in the target region.

In some embodiments, the at least one processor may obtain coordinates of the first POI. The at least one processor may determine a first set of POIs that include all POIs within a preset range of the coordinates of the first POI. The at least one processor may determine a second set of POIs from the first set of POIs, the second set of POIs including only parent POIs. The at least one processor may determine that the second POI is parent POI of the first POI by comparing the second portion of the first location name with each POI in the second set of POIs.

In some embodiments, the at least one processor may determine a similarity between the second portion of the first location name and each POI in the second set of POIs. The at least one processor may determine whether the similarity between the second portion of the first name and each POI in the second set of POIs is equal to or higher than a first threshold.

In some embodiments, the at least one processor may determine a first parent-child relationship between the second POI and the first POI. The at least one processor may store the first parent-child relationship between the second POI and the first POI.

In some embodiments, the at least one processor may obtain a third POI based on the second POI, wherein the third POI is a child POI of the second POI and a distance between the third POI and the first POI is lower than a second threshold. The at least one processor may compare the third POI and the first POI. The at least one processor may determine a recommended POI between the third POI and the first POI based on the comparison.

In some embodiments, the at least one processor may compare a heat degree of the third POI and that of the first POI. The at least one processor may designate one of the third POI and the first POI that has a higher heat degree as the recommended POI.

In some embodiments, the at least one processor may determine that the coordinates of the first POI need to be adjusted based on the second POI. The at least one processor may adjust the coordinates of the first POI.

In some embodiments, to determine that the coordinates of the first POI need to be adjusted, the at least one processor may be further directed to determine an outline of the second POI. The at least one processor may compare the first POI and the outline of the second POI associated with the first POI, and determine that the coordinates of the first POI need to be adjusted when a distance from the first POI to the outline of the second POI is equal to or smaller than a third threshold.

According to another aspect of the present disclosure, a method is provided. The method may be implemented on a computing device having at least one processor, at least one storage medium, and a communication platform connected to a network. The method may include one or more of the following operations. The at least one processor may obtain a first location name of a first point of interest (POI). The at least one processor may perform a word segmentation operation on the first location to obtain a plurality of portions of the first location name. The at least one processor may determine a first portion from the plurality of portions by comparing to a first portion name database, the first portion indicating that the first POI is a child POI. The at least one processor may determine a second POI based on a second portion of the first location name and that the second POI is a parent POI of the first POI.

According to a further aspect of the present disclosure, a non-transitory computer readable medium is provided. The non-transitory computer readable medium may include a set of instructions for determining parent-child relationships. When the at least one processor executes the set of instructions, the at least one processor may be directed to perform one or more of the following operations. The at least one processor may obtain a first location name of a first point of interest (POI). The at least one processor may perform a word segmentation operation on the first location to obtain a plurality of portions of the first location name. The at least one processor may determine a first portion from the plurality of portions by comparing to a first portion name database, the first portion indicating that the first POI is a child POI. The at least one processor may determine a second POI based on a second portion of the first location name and that the second POI is a parent POI of the first POI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
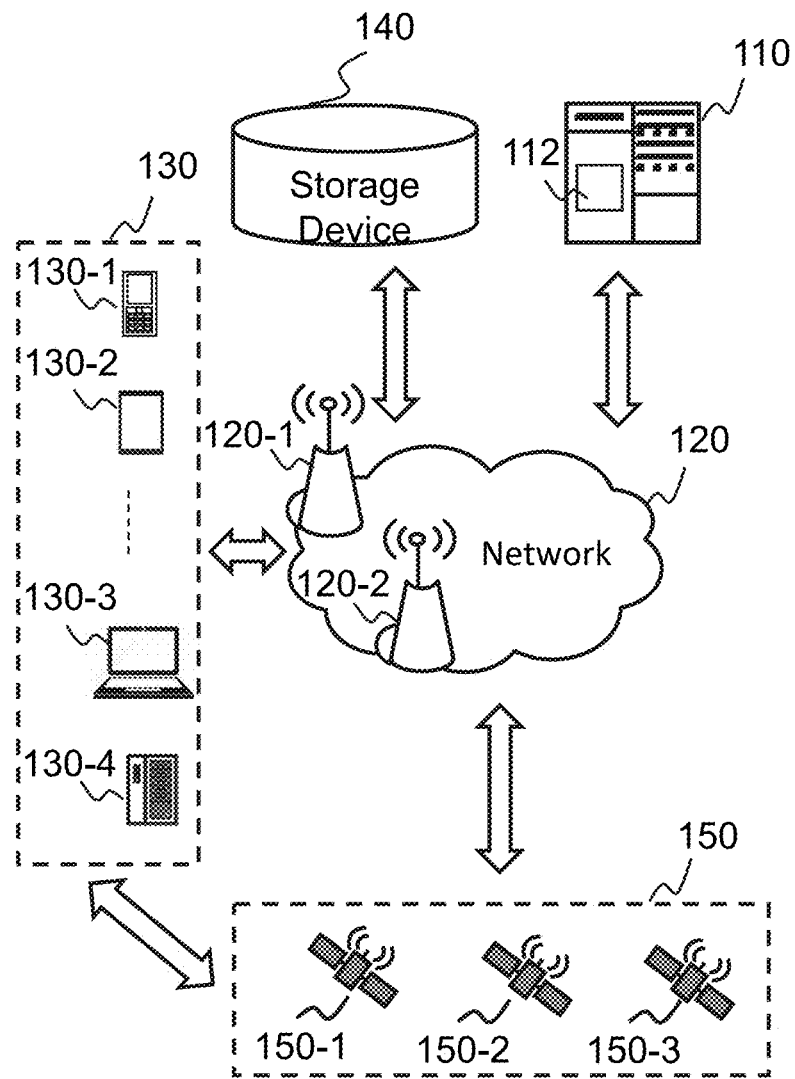
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding determining indexes for a plurality of data points, it should also be understood that this is only one exemplary embodiment. The system and method in the present disclosure may be applied to any application scenario which may produce spatial big data. For example, the system and method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The system and method of the present disclosure may be applied to taxi hailing, chauffeur services, delivery service, carpool, bus service, take-out service, driver hiring, vehicle hiring, bicycle sharing service, train service, subway service, shuttle services, location service, or the like, among others. As used here, big data refers to data of which the amount is large to the extent that requires indexing for efficient processing.

The terms "passenger," "requestor," "service requestor," and "customer" in the present disclosure are used interchangeably to refer to an individual, an entity or a tool that may request or order a service. Also, the terms "driver,"

"provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable, or free.

An aspect of the present disclosure relates to systems and methods for determining parent-child relationships between POIs based on name information and coordinate information associated with the POIs. To this end, the system may obtain name information of a first POI. The system may then determine a generalizing portion (i.e. second portion) and a specializing portion (i.e. first portion) of the name information, wherein the generalizing portion indicates a parent POI of the first POI, and the specializing portion indicates that the first POI is a child POI. A parent POI may be a region with a relative large area (e.g., a gated community) and a child POI may be a point location inside a parent POI (e.g., a gate of a gated community). The system may further determine a parent-child relationship between the first POI and the second POI based on coordinate information of the first POI. For example, the system may determine a geographic location relationship between the first POI and the second POI.

It should be noted that parent-child relationship determination, overall, is a technology deeply rooted in Internet world. In certain cases, determining one or more parent-child relationships based on name information and coordinate information associated with POIs is not possible without the communications between terminal devices and a remote server. Therefore, the technical solution disclosed in the present disclosure is also a technology deeply rooted in Internet era.

FIG. 1 is a schematic diagram of an exemplary online to offline service system 100 according to some embodiments. For example, an online to offline service system 100 may be an online transportation services (e.g., taxi hailing, chauffeur services, delivery services, carpool, bus services, take-out services, driver hiring, vehicle hiring, train services, subway services, shuttle services), shopping services, fitness services, learning services, financial services, or the like.

The online to offline service system 100 may include a server 110, a network 120, a user terminal 130, a storage device 140, and a positioning system 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the user terminal 130, and/or the storage device 140 via the network 120. As another example, the server 110 may be directly connected to the user terminal 130, and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to parent-child relationship determination. For example, the processing engine 112 may determine a parent POI based on a generalizing portion of name information of a POI. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the online to offline service system 100 (e.g., the server 110, the user terminal 130, the storage device 140, and the positioning system 150) may send information and/or data to other component(s) in the online to offline service system 100 via the network 120. For example, the processing engine 112 may obtain name information of a POI from the storage device 140 and/or the user terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, the user terminal 130 may include a mobile device 130-1, a tablet computer 130-2, a laptop computer 130-3, or the like, or any combination thereof. In some embodiments, the mobile device 130-1 may include a smart home device, a wearable device, a mobile equipment, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile equipment may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, the user terminal 130 may be a device with positioning technology for locating the position of the user terminal 130. In some embodiments, the user terminal 130 may send positioning information to the server 110.

The storage device 140 may store data and/or instructions. In some embodiments, the storage device 140 may store data obtained from the user terminal 130 and/or the processing engine 112. For example, the storage device 140 may store a plurality of data obtained from the user terminal 130. As another example, the storage device 140 may store a generalizing portion and a specializing portion of a POI determined by the processing engine 112. In some embodiments, the storage device 140 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components in the online to offline service system 100 (e.g., the server 110, the user terminal 130, etc.). One or more components in the online to offline service system 100 may access the data or instructions stored in the storage device 140 via the network 120. In some embodiments, the storage device 140 may be directly connected to or communicate with one or more components in the online to offline service system 100 (e.g., the server 110, the user terminal 130, etc.). In some embodiments, the storage device 140 may be part of the server 110.

The positioning system 150 may determine information associated with an object, for example, the user terminal 130. For example, the positioning system 150 may determine a location of the user terminal 130 in real time. In some embodiments, the positioning system 150 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, an accumulative mileage number, or a current time. The location may be in the form of coordinates, such as, latitude coordinate and longitude coordinate, etc. The positioning system 150 may include one or more satellites, for example, a satellite 150-1, a satellite 150-2, and a satellite 150-3. The satellites 150-1 through 150-3 may determine the information mentioned above independently or jointly. The satellite positioning system 150 may send the information mentioned above to the network 120, or the user terminal 130 via wireless connections.

Figure 2:
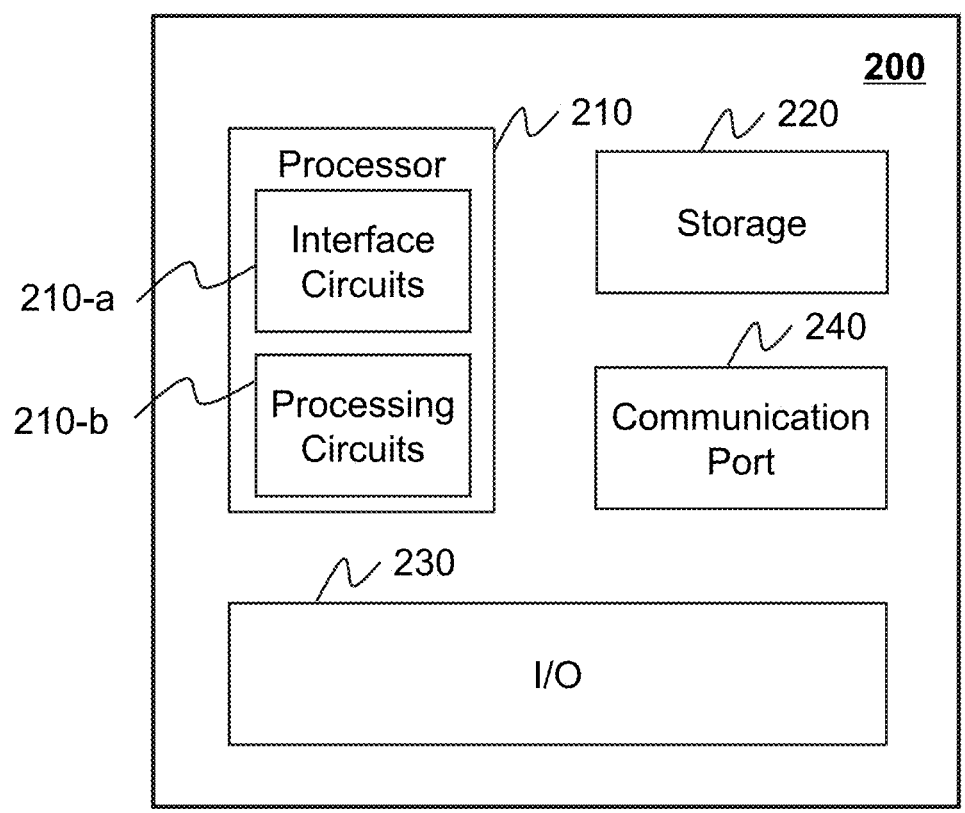
FIG. 2 is a schematic diagram illustrating exemplary hardware and/or software components of a computing device on which a processing engine may be implemented according to some embodiments of the present disclosure.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may process an input destination (e.g., a AOI) obtained from the user terminal 130, the storage device 140, and/or any other component of the online to offline service system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 130, the storage device 140, and/or any other component of the online to offline service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for determining parent-child relationships.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 130, the positioning system 150, or the storage device 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
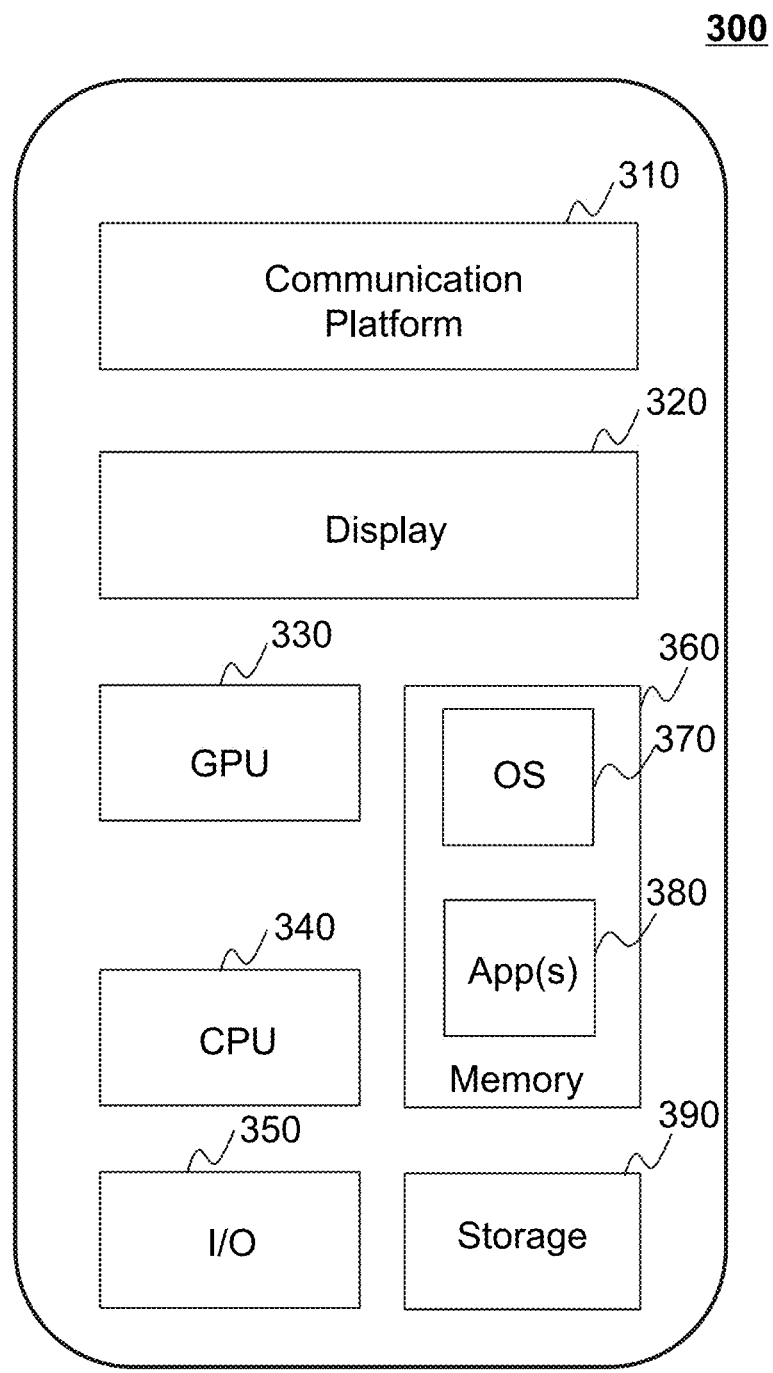
FIG. 3 is a schematic diagram illustrating exemplary hardware and/or software components of a mobile device on which an user terminal may be implemented according to some embodiments of the present disclosure.

FIG. 3 is a schematic diagram illustrating exemplary hardware and/or software components of a mobile device on which the user terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving an input destination or other information related to an online to offline service from the processing engine 112. User interactions with the information stream may be achieved via the I/O 350 and provided to the processing engine 112 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the online to offline service system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 receives data (e.g., a first location name of a first POI) from the user terminal 130, a processor of the processing engine 112 may receive electrical signals including the data. The processor of the processing engine 112 may receive the electrical signals through an input port. If the user terminal 130 communicates with the processing engine 112 via a wired network, the input port may be physically connected to a cable. If the user terminal 130 communicates with the processing engine 112 via a wireless network, the input port of the processing engine 112 may be one or more antennas, which may convert the electrical signals to electromagnetic signals. Within an electronic device, such as the user terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage device 140), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, series of electrical signals, and/or a plurality of discrete electrical signals.

Figure 4:
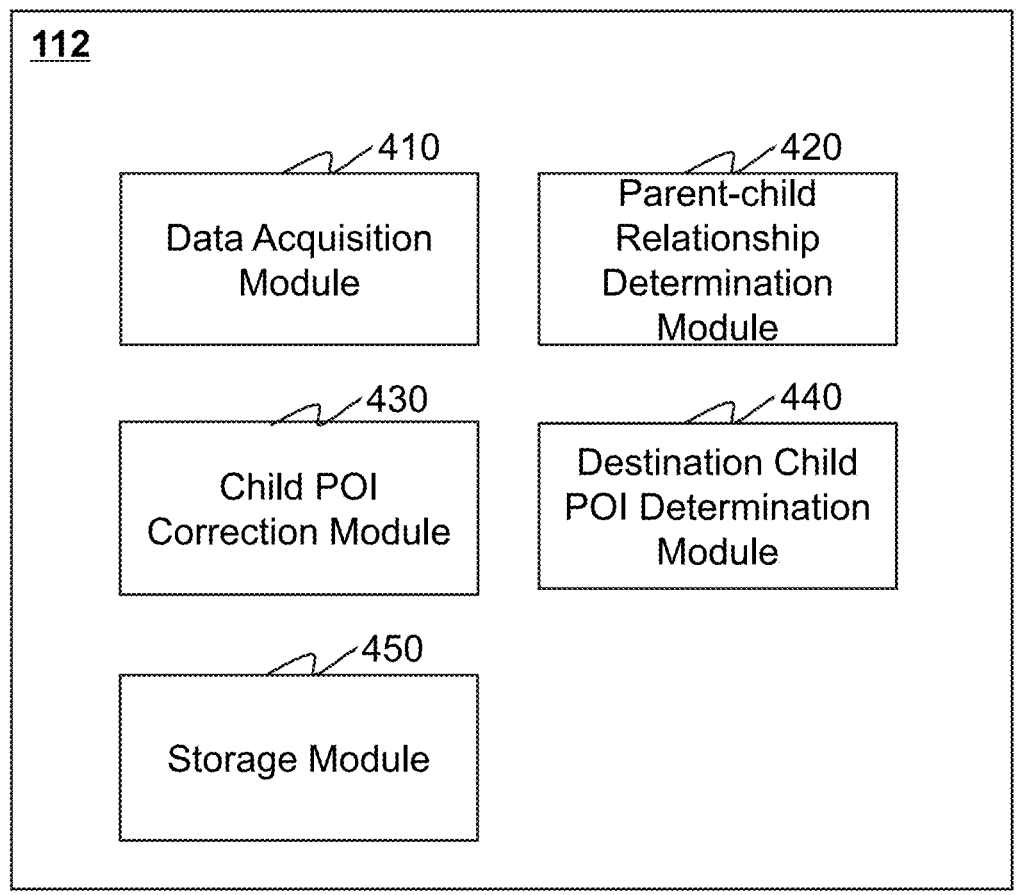
FIG. 4 is a schematic block diagram illustrating an exemplary processing engine according to some embodiments of the present disclosure.

FIG. 4 is a schematic block diagram illustrating an exemplary processing engine 112 according to some embodiments of the present disclosure. The processing engine 112 may include a data acquisition module 410, a parent-child relationship determination module 420, a child POI determination module 430, a destination child POI determination module 440, and a storage module 450.

The data acquisition module 410 may obtain data related to POIs. In some embodiments, the data related to parent-child relationship determination of POIs may include name information, location information of POIs, historical service orders associated with the POIs, parent-child relationships relating to a POI, etc. In some embodiments, the data acquisition module 410 may further obtain a transportation service for a requestor by a vehicle, and the request may include a POI name which indicates a destination of the vehicle. In certain embodiments, the POI name corresponds to a parent POI or a child POI. The data acquisition module 410 may obtain the data related to POIs from a storage medium (e.g., the storage device 140, or the storage 220 of the processing engine 112) and/or the user terminal 130.

As used herein, a parent-child relationship relating to a parent POI may be defined by the parent POI and a child POI associated with the parent POI. The parent-child relationship between a parent POI and a child POI may be determined based on a relationship between geographic positions of the parent POI and the child POI, a service provided by the parent POI and/or the child POI, etc. The parent POI may refer to a region with a relative large area which may include one or more other POIs (e.g. child POIs). The child POI may be a POI indicating a more accurate location than the parent POI of the child POI. In some embodiments, a child POI having a parent-child relationship with a parent POI may be located physically inside the parent POI. For example, a park may be considered a parent POI, and a building located inside the park may be considered a child POI of the parent POI. As another example, a subway station may be considered a parent POI, and an entrance of the subway station may be considered a child POI of the subway station. In some embodiments, a child POI having a parent-child relationship with a parent POI may not be located inside the parent POI. For example, a stadium may be considered a parent POI, and one or more parking lots associated with the stadium may be considered child POIs of the stadium. The parking lots may be not physically located inside the stadium.

In some embodiments, the data acquisition module 410 may obtain the name information and the location information of POIs from the storage device 140 via the network 120 and/or the user terminal 130. The name information of a POI may include a location name of a POI; the location name may include one or more portions. In some embodiments, the one or more portions of a location name may include a generalizing portion, a specializing portion, or the like, or any combination thereof. As used herein, the location name of a POI may refer to a phrase (e.g., "Happy Community") input by a user as a destination when requesting a transportation service. The location information of a POI may include coordinates of a geographic point location of a child POI, an outline of the geographic area of a parent POI, or the like, or any combination thereof. In some embodiments, the outline of a parent POI may be represented by a plurality of points with coordinates depicting the outline of the parent POI.

In some embodiments, the data acquisition module 410 may obtain the historical service orders associated with POIs from the storage device 140 via the network 120. As used herein, the term "historical service order" generally refers to a service request that has been completed. For example, a requestor may send a service request for a service (e.g., a transportation service) to the online to offline service system 100. A service provider may accept the service request and provide the service to the requestor, indicating that the service request has been completed. The online to offline service system 100 may save this service request as a historical service order into a storage device (e.g., the storage device 140) which may include certain information include but not limited to a historical start location, a historical destination, a historical start time, a historical time of arrival (also referred to as "actual time of arrival"), etc. In some embodiments, the data acquisition module 410 may obtain historical service orders based on historical destinations therein. For example, the data acquisition module 410 may obtain historical service orders whose historical destinations are a POI with a preprocessed location name (e.g. "Happy Community East Gate"). In some embodiments, the data acquisition module 410 may obtain the historical service orders within a certain period (e.g., the past 1 month, the past 2 months, etc.)

The parent-child relationship determination module 420 may be configured to determine a parent-child relationship between the POIs. As described in connection with the data acquisition module 410, the parent-child relationship determination module 420 may determine a parent-child relationship based on the name information and the location information of POIs relating to the parent-child relationship. In some embodiments, the parent-child relationship determination module 420 may determine a parent POI based on a generalizing portion of a POI in response to that the POI is a child POI. In some embodiments, the parent-child relationship determination module 420 may determine a POI as a child POI based on a specializing portion of the POI. As used herein, the specializing portion of a POI name (i.e. location name of the POI) may be a portion that indicates that the POI is part of or defined by another POI. In some embodiments, the specializing portion is a first portion or a last portion of a preprocessed location name of the POI. In certain embodiments, the specializing portion is a last portion of the POI name and restricts the other portion(s). In some embodiments, the generalizing portion of the POI name that defines a more general area of the POI or a related POI. In certain embodiments, the generalizing portion is a first or last portion of the POI name. For example, the generalizing portion may be words in the location name of the POI other than the last portion, which may be the specializing portion. In some embodiments, the location name of the POI is segmented by a word segmentation technology, producing one or more portions, including the generalizing portion and/or the specializing portion. In some embodiments, the parent-child relationship determination module 420 may determine whether a POI is a child POI by comparing a specializing portion of the POI with a specializing portion name database.

The child POI correction module 430 may be configured to correct information related to a child POI. In some embodiments, the child POI correction module 430 may correct coordinates of a child POI in response to a determination that the child POI is outside its parent POI. In some embodiments, the child POI correction module 430 may recommend and/or output just one child POI of two or more child POIs based on heat degrees of the two or more child POIs.

The destination child POI determination module 440 may be configured to determine one or more child POIs of a parent POI. In some embodiments, the destination child POI determination module 440 may determine one or more child POIs of a parent POI based on one or more parent-child relationships relating to the parent POI. The destination child POI may output the one or more child POIs to the user terminal 130 (e.g., a mobile) for selecting a specific destination by the user via the input/output (I/O) 230. In some embodiments, the destination child POI determination module 440 may further assess the one or more child POIs before outputting the child POIs.

The storage module 450 may be configured to store intermediate results produced during data processing. The intermediate results may include the location name of a POI, the generalizing portion of the location name of a POI, the specializing portion the location name of a POI, the coordinates of a child POI, the heat degree of a child POI, the outline of a parent POI, or the like, or any combination thereof. For example, the storage module 450 may store a distance between two child POIs during a child POI correction process. In some embodiments, the storage module 450 may store one or more programs and/or instructions that may be executed by the processor(s) of the processing engine 112 to perform exemplary methods described in this disclosure. For example, the storage module 450 may store program(s) and/or instruction(s) that can be executed by the processor(s) of the processing engine 112 to acquire POIs, and/or store a parent-child relationship between two POIs.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Part of the entirety of one or more of the modules may be omitted. Two or more of the modules may be combined into a single module, and any one of the modules may be divided into two or more sub-units. For example, the parent-child relationship determination module 420 and the child POI correction module 430 may be combined as a single module which may both determine one or more parent-child relationships and correct one or more child POIs.

Figure 5:
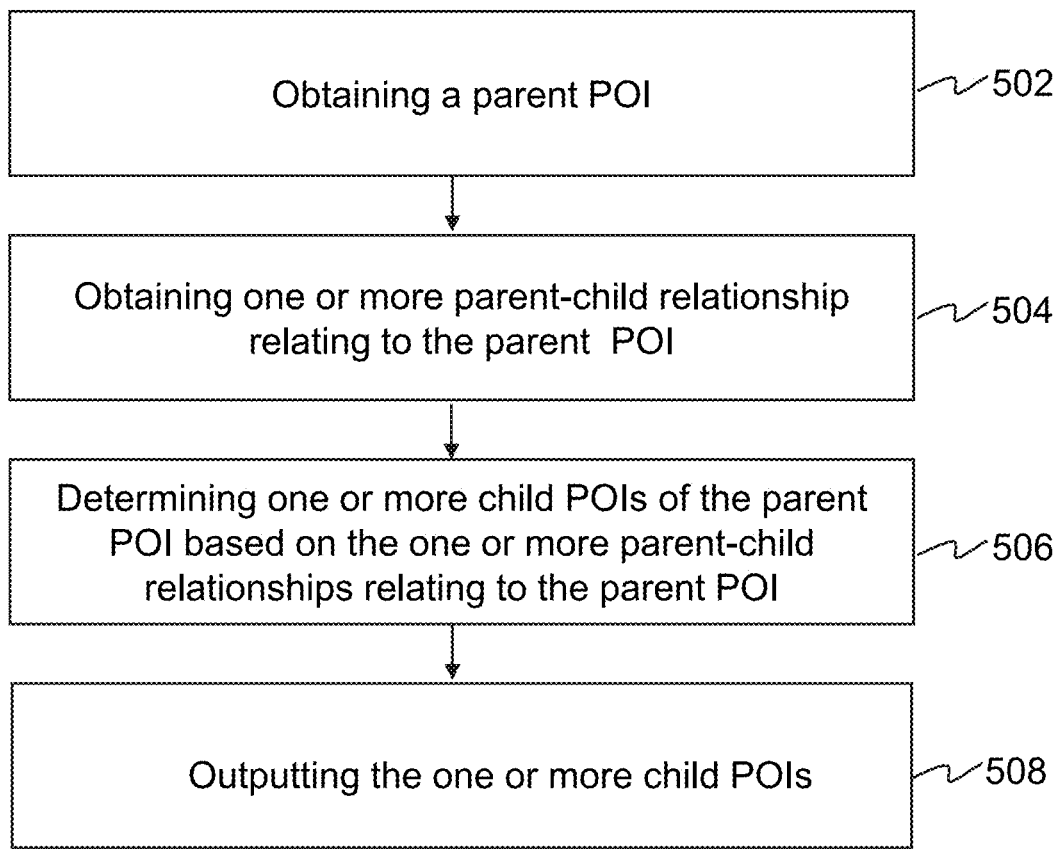
FIG. 5 is a flowchart illustrating an exemplary process for outputting one or more child POIs based on a parent POI obtained from a user according to some embodiments of the present disclosure.

FIG. 5 is a flowchart illustrating an exemplary process 500 for outputting one or more child POIs based on a parent POI according to some embodiments of the present disclosure. The process 500 may be executed by the online to offline service system 100. For example, the process 500 may be implemented as a set of instructions (e.g., an application) stored in a storage device (e.g., the storage device 140). The processor 210 and/or the modules in FIG. 4 may execute the set of instructions and, when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In step 502, the processing engine 112 (e.g., the data acquisition module 410) (e.g., the processing circuits 210-*b* of the processor 210) may obtain a parent POI. Here, as in some embodiments, the term "POI" refers to information related to a POI, such as but not limited to POI location, POI name (location name), POI status (parent, child, or both parent and child), coordinates, or coordinate ranges, etc. The processing engine 112 (e.g., the data acquisition module 410) may obtain the parent POI from the user terminal 130 (e.g., a smartphone of a user in need of a transportation service) or the storage device 140 via the network 120. For example, when a service provider is providing a transportation service for a requestor by a vehicle, the processing engine 112 may obtain a parent POI which indicates a destination of the vehicle from the user terminal 130. Further, the processing engine 112 may store the parent POI in a storage device (e.g., the storage device 140) disclosed elsewhere in the present disclosure.

As used herein, the parent POI may refer to a region with a relative large area which may include one or more other POIs. Merely by way of example, the parent POI may be a residential community, a park, a subway station, or the like, or any combination thereof.

In step 504, the processing engine 112 (e.g., the data acquisition module 410) (e.g., the processing circuits 210-*b* of the processor 210) may obtain one or more parent-child relationships relating to the parent POI. The processing engine 112 may obtain the one or more parent-child relationships from the storage 220 or the storage device 140 via the network 120. As used herein, a parent-child relationship relating to a parent POI may be defined by the parent POI and a child POI associated with the parent POI. The parent-child relationship between a parent POI and a child POI of the parent POI may be determined based on a relationship between geographic positions of the parent POI and the child POI, or a service provided by the parent POI and/or the child POI. In some embodiments, a child POI having a parent-child relationship with a parent POI may be located physically inside the parent POI. For example, a park may be considered a parent POI, and a building located inside the park may be considered a child POI of the parent POI. As another example, a subway station may be considered a parent POI, and an entrance of the subway station may be considered a child POI of the subway station. In some embodiments, a child POI having a parent-child relationship with a parent POI may not be located inside the parent POI. For example, a stadium may be considered a parent POI, and one or more parking lots associated with the stadium may be considered child POIs of the stadium. The parking lots may be not physically located inside the stadium.

In some embodiments, the parent POI obtained in step 502 may have multiple parent-child relationships, which means the parent POI may have multiple child POIs. For example, a residential community may be considered a parent POI. The residential community may include multiple gates (e.g., an east gate of the residential community, a northwest gate of the residential community), which may be considered as child POIs of the residential community. Then, the multiple parent-child relationships between the residential community and the gates of the residential community may be obtained.

Figure 6:
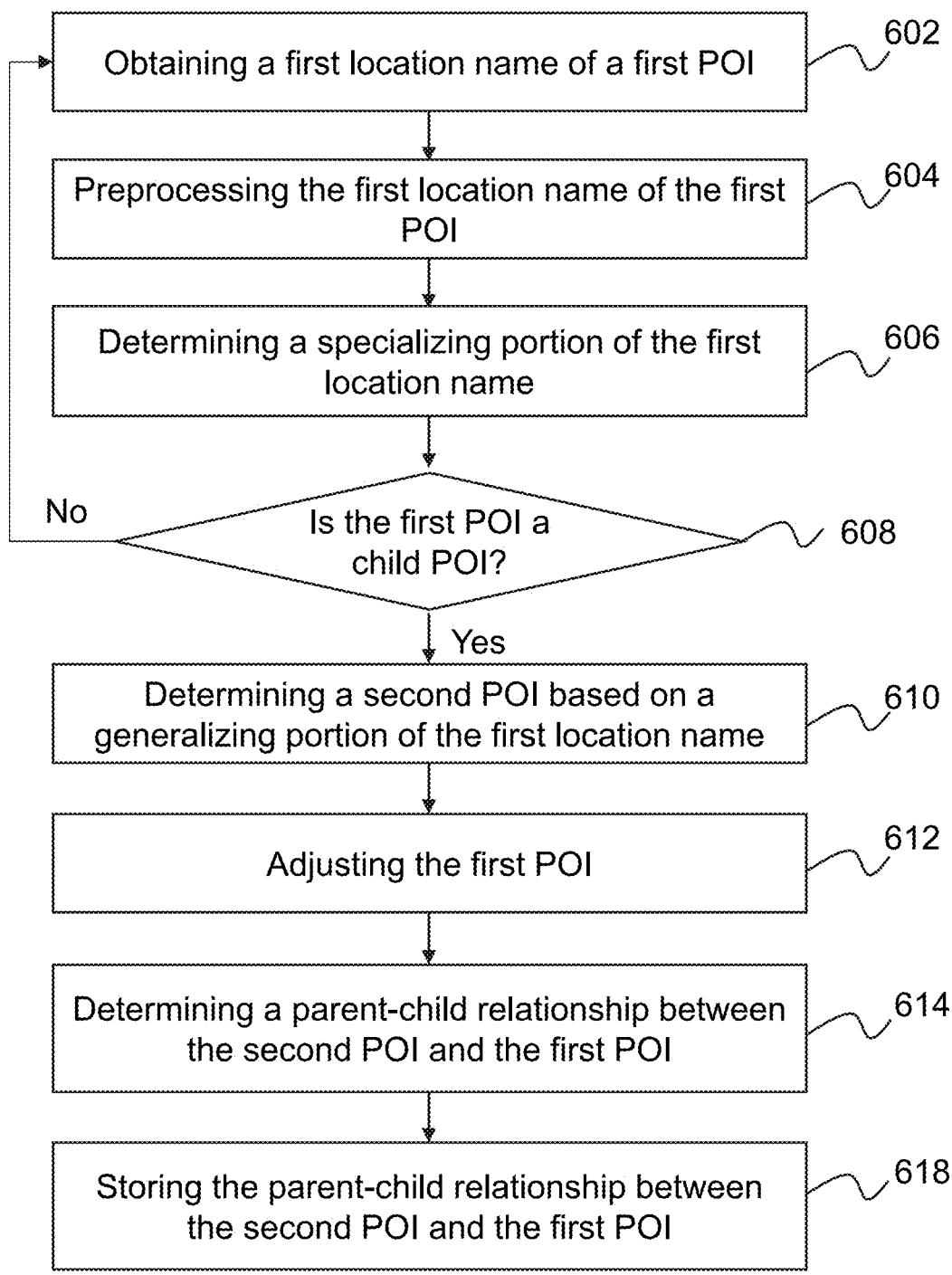
FIG. 6 is a flowchart illustrating an exemplary process for determining a parent-child relationship according to some embodiments of the present disclosure.

In some embodiments, the one or more parent-child relationships relating to the parent POI obtained in step 502 may be determined by the processing engine 112 (e.g., the parent-child relationship determination module 420) according to process 600 as descried in connection with FIG. 6. The determined parent-child relationships relating to the parent POI may be stored in the storage device 140, the storage 220, the storage 390, the storage module 450, or any other external storage.

In step 506, the processing engine 112 (e.g., the destination child POI determination module 440) (e.g., the processing circuits 210-*b* of the processor 210) may determine one or more child POIs of the parent POI based on the one or more parent-child relationships relating to the parent POI. The child POIs associated with the parent-child relationships relating to the parent POI may be determined as the child POIs of the parent POI. For example, when the parent POI is a subway station (e.g., Peace Gate Subway Station), the parent-child relationships relating to the parent POI may be defined by the subway station and other POIs inside the subway station, for example, one or more subway entrances (e.g., Entrance A of the Peace Gate Subway Station, Entrance B of the Peace Gate Subway Station, etc.). The processing engine 112 may determine one or more subway entrances of the subway station (e.g., an Entrance A of the Peace Gate Subway Station, an Entrance B the Peace Gate Subway Station) as the one or more child POIs of the parent POI based on the parent-child relationships relating to the subway station. The establishment of the parent-child relationship as in some embodiments is described elsewhere in the present application.

In step 508, the processing engine 112 (e.g., the input/output (I/O) 230 of the processor 210) may output the one or more child POIs. In some embodiments, the processing engine 112 (e.g., the input/output (I/O) 230 of the processor 210) may output the one or more child POIs to the user terminal 130 (e.g., a mobile) for selecting a specific destination by the user. For example, when the obtained parent POI is a shopping mall, the processing engine 112 may output multiple child POIs including an east gate in district "A" of the shopping mall, a south gate in district "A" of the shopping mall, a north gate in district "B" of the shopping mall, etc., to the user terminal 130 (e.g., a mobile). The user may choose which child POI is the specific destination the user wants to use.

In some embodiments, the processing 112 (e.g., the destination child POI determination module 440 or the child POI correction module 430) may further assess the one or more child POIs before outputting some or all of the child POIs based on the assessment. Further, the processing engine 112 (e.g., the destination child POI determination module 440 or the child POI correction module 430) may assess the child POIs based on a heat degree of a child POI. In some embodiments, as used herein, the heat degree of a POI (e.g. a child POI) may relate to the quantity of orders with the POI as the destination within a certain time period (e.g., three months, six months, one year, etc.). The larger the quantity of orders with a POI as the destination is, the higher the heat degree of the child POI may be. In some embodiments, the heat degree may also be assessed based on the trend of a POI being used as the destination. For example, the processing engine 112 may calculate how the quantity of order for a POI has been changing month-by-month in the past three months and consider the rate of increase as the heat degree.

In some embodiments, the processing engine 112 may rank the child POIs by their heat degrees. In some embodiments, the processing engine 112 may recommend and/or output one or more child POIs having the highest heat degree(s). In some embodiments, only one child POI with the highest heat degree is recommended and/or transmitted to the requestor's terminal. In some embodiments, one or more child POIs with the lowest rankings are recommended and/or transmitted. In some embodiments, the processing engine 112 may recommend and/or output at least one portion of all the child POIs in the order according to the degree heat ranking of the child POIs. In some embodiments, the processing engine 112 (e.g., the destination child POI determination module 440 or the child POI correction module 430) may assess the child POIs based on a distance between two of the one or more child POIs. If a distance between two child POIs is smaller than a threshold, the processing engine 112 (e.g., the destination child POI determination module 440 or the child POI correction module 430) may recommend and/or output just one of the two child POIs to a user.

For example, when a user inputs the parent POI (e.g., "Peace Gate Subway Station"), the one or more child POIs determined in step 506 may include a first child POI (e.g., "Peace Gate Subway Station Entrance A") and a second child POI (e.g., "Peace Gate Subway Station First Entrance" or "Peace Gate Subway Station Entrance B"). The first child POI (e.g., "Peace Gate Subway Station Entrance A") and the second child POI (e.g., "Peace Gate Subway Station First Entrance" or "Peace Gate Subway Station Entrance B") may be both child POIs of the parent POI (e.g., "Peace Gate Subway Station"). The processing engine 112 may determine heat degrees of the first child POI and the second child POI based on quantity of historical service orders with the first child POI and the second child POI respectively as the destination within a time period (e.g. three months). The processing engine 112 may recommend one of the first child POI or the second child POI with a higher heat degree to the user. In some embodiments, the processing engine 112 may determine that the first child POI and the second child POI have similar heat degrees (e.g., the difference is lower than a predetermined threshold) and the distance between the first child POI and the second child POI is less than a certain range (e.g., 30 meters); then, the processing engine 112 may recommend and/or output one of child POIs by random selection.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store the parent POI, the one or more parent-child relationships, and/or the one or more child POIs in any storage device (e.g., the storage device 140) disclosed elsewhere in the present disclosure.

FIG. 6 is a flowchart illustrating an exemplary process 600 for determining a parent-child relationship according to some embodiments of the present disclosure. In some embodiments, step 504 of process 500 may be performed based on the process 600. The process 600 may be executed by the online to offline service system 100. For example, the process 600 may be implemented as a set of instructions (e.g., an application) stored in a storage device (e.g., the storage device 140). The processor 210 and/or the modules in FIG. 4 may execute the set of instructions and, when executing the instructions, the processor 210 and/or the units may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In step 602, the processing engine 112 (e.g., the data acquisition module 410, or the processing circuits 210-b of the processor 210) may obtain a first location name of a first POI. The processing engine 112 may obtain the first location name of the first POI from, for example, the storage device 140, the storage 220, the storage 390, the storage module 450, or any other external storage via the network 120.

In some embodiments, the first POI may be collected from the user terminal 130 (e.g., a smartphone of a user in need of a transportation service). The user may input the first location name into the user terminal 130 to indicate the first POI as a destination of the transportation service. The first POI may be a location with coordinates or a range of coordinates. The first POI may be a parent POI or a child POI.

In step 604, the processing engine 112 (e.g., the parent-child relationship determination module 420) (e.g., the processing circuits 210-b of the processor 210) may preprocess the first location name of the first POI. For example, the processing engine 112 may convert the first location name of the first POI into a standardized format. As used herein, the standardized format may refer that words in the first location name are in a unified form and/or language. For example, the processing engine 112 may convert a Roman numeral and/or an Arabic numeral in the first location name into an alphanumeric character. As another example, the processing engine 112 may remove one or more symbols (e.g., punctuations) from the first location name. As a further example, the processing engine 112 may remove the comma in the first location name "Oriental Pearl Tower Station, Entrance A" and the preprocessed first location name may be "Oriental Pearl Tower Station Entrance A". As still an example, the processing engine 112 may convert the first letter of each word in the first location name into a capital letter or convert each capital letter in the first location name into a lowercase letter. In some embodiments, the processing engine 112 may further identify coordinates of the first POI and store the coordinates in the storage device 140.

In step 606, the processing engine 112 (e.g., the parent-child relationship determination module 420 or the processing circuits 210-b of the processor 210) may determine a specializing portion of the first location name. In some embodiments, the processing engine 112 may segment the first location name into multiple portions with a word segmentation technology. Each portion may include one or more words. Then, the processing engine 112 may identify the specializing portion of the first location name from the multiple portions. As used herein, the specializing portion may indicate that the first POI may be a child POI. Exemplary word segmentation technologies may include word segmentation algorithms based on dictionaries and thesaurus matching, word segmentation algorithms based on word frequency statistics, word segmentation algorithm based on knowledge comprehension, or the like, or any combination thereof.

In some embodiments, the processing engine 112 may identify the specializing portion of the first location name from the multiple portions by comparing some of each portion of the first location name with a first specializing portion name database. In some embodiments, each of the portions is compared. In some embodiments, a mostly likely portion is compared before and the other portions are compared only when the most likely portion turns out not be the specializing portion. For example, in some languages (e.g., Chinese) it is most likely that the last portion of the first location name is the specializing portion and the processing engine 112 may first compare the last portion with the a specializing portion name database. Further, if one portion of the multiple portions is in the specializing portion name database, the one portion of the multiple portions may be designated as the specializing portion of the first location name.

In some embodiments, the processing engine 112 may identify the specializing portion of the first location name from the multiple portions based on a position of the specializing portion in the first location name. Further, if one portion of the multiple portions is located at the head end or the back end of the first location name, the portion may be designated as the specializing portion of the first location name. As used herein, the first specializing portion name database may include a plurality of specific words or word groups which may represent multiple specializing portions of location names. The first specializing portion name database may have default settings of the online to offline service system 100, or may be adjustable under different situations. The first specializing portion name database may be updated periodically.

For example, if the preprocessed first location name is "Oriental Pearl Tower Station Entrance A", the processing engine 112 may divide the first location name into a first portion and a second portion. The second portion of the first location name may include "Oriental Pearl Tower Station" and the first portion of the first location name may include "Entrance A". If the first portion is determined to be in the specializing portion name database, the first portion may be determined as the specializing portion of the "Oriental Pearl Tower Station Entrance A".

In step 608, the processing engine 112 (e.g., the parent-child relationship determination module 420) (e.g., the processing circuits 210-b of the processor 210) may determine whether the first POI is a child POI. In some embodiments, the processing engine 112 may determine whether the first POI is a child POI based on the determination that there is a specializing portion in the first location name of the first POI. In some embodiments, the processing engine 112 may determine whether the first POI is a child POI based on the determination that the identified specializing portion is in a second specializing portion name database. For example, the processing engine 112 may determine that the first POI with the preprocessed first location name (e.g., "Oriental Pearl Tower Station Entrance A") is a child POI as the specializing portion of the first location name (e.g., "Entrance A") is stored in the second specializing portion name database. For another example, the processing engine 112 may determine the first POI with the preprocessed first location name (e.g., "Oriental Pearl Tower Station") is not a child POI as there is no specializing portion in the first location name.

As used herein, the second specializing portion name database may include a plurality of words and/or word groups which may be existed in a location name of a child POI. In some embodiments, the specializing portion name database may include "Entrance A", "Entrance B", "East Gate", "Northwest Gate", "Building A", "Exit one", or the like, or any combination thereof. The second specializing portion name database may have default settings of the online to offline service system 100, or may be adjustable under different situations. The second specializing portion name database may be updated periodically. In some embodiments, the second specializing portion name database may be determined by specializing location names from recognized child POIs.

In response to the determination that the first POI is not a child POI, the processing engine 112 may terminate the process 600 or execute the process 600 to step 602 to obtain a first location name of another first POI. In response to the determination that the first POI is a child POI, the processing engine 112 may execute the process 600 to step 610 to determine a second POI based on the generalizing portion of the first location name.

In step 610, the processing engine 112 (e.g., the parent-child relationship determination module 420) (e.g., the processing circuits 210-*b* of the processor 210) may determine a second POI based on a generalizing portion of the first location name. The second POI may be a parent POI relating to the first POI. For example, the first POI may indicate a more accurate location that is inside the second POI or associated with the second POI.

The processing engine 112 may search for all POIs within a certain preset range (e.g., 800 meters, 500 meters) of the coordinates of the first POI (e.g., using a K-dimensional Tree algorithm). The coordinates of the first POI may be obtained from the user terminal 130, the storage device 140, the positioning system 150, the storage module 450, or any other external storage. The preset range may have default settings of the online to offline service system 100, or may be adjustable under different situations. The POIs within the certain preset range may be referred to as a first set of POIs.

In some embodiments, the processing engine 112 may filter the first set of POIs. For example, the processing engine 112 may remove POIs within the certain preset range of the first POI with other specializing portions (e.g., "Entrance B", "Entrance C") different from the specializing portion (e.g., "Entrance A") of the first location name determined in step 606 to obtain the candidate second POIs. The filtered first set of POIs may be referred to as a second set of POIs. The second set of POIs may include a plurality of candidate second POIs. The plurality of candidate second POIs may be potential parent POIs within a certain preset range (e.g., 800 meters) of the first POI.

In some embodiments, the processing engine 112 may select a second POI from the plurality of candidate second POIs based on a similarity between the first POI and each of the candidate second POIs. If a similarity between the first POI and a candidate second POI is higher than a similarity threshold (also referred to as "a first threshold") (e.g., 98%), the candidate second POI may be designated as the second POI relating to the first POI. The similarity threshold may have default settings of the online to offline service system 100, or may be adjustable under different situations. More descriptions for determining the second POI may be found in FIG. 7.

In step 612, the processing engine 112 (e.g., the child POI correction module 430) (e.g., the processing circuits 210-*b* of the processor 210) may correct information related to the first POI.

In some embodiments, the processing engine 112 may assess the first POI based on the second POI. For example, the processing engine 112 may determine whether the first POI is inside an outline of the second POI. As another example, the processing engine 112 may determine whether the coordinates of the first POI need to be corrected based on the outline of the second POI and a distance between the first POI and the outline of the second POI. The correction of the first POI may be found in FIG. 8 and the description thereof.

In step 614, the processing engine 112 (e.g., the parent-child relationship determination unit 510 of the data processing module 410) (e.g., the processing circuits 210-*b* of the processor 210) may determine a parent-child relationship between the second POI and the first POI. The processing engine 112 may determine the second POI as a parent POI of the first POI and the first POI as a child POI of the second POI.

In step 618, the processing engine 112 (e.g., the storage unit 540 of the data processing module 410) (e.g., the processing circuits 210-*b* of the processor 210) may store the parent-child relationship between the second POI and the first POI. In some embodiments, the processing engine 112 may store the parent-child relationship between the second POI and the first POI in a storage device (e.g., the storage device 140) disclosed elsewhere in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In some embodiments, the process 600 may further include determining a reduplication parent-child relationship between a third POI and the second POI according to steps 602-618. A distance between the third POI and the first POI may be less than a threshold (e.g., 30 meters). The third POI may be a child POI of the second POI. One of the parent-child relationship of the second POI may be removed from for example, a storage device storing the parent-child relationships based on a heat degree of the first POI and the third POI. In some embodiments, the parent-child relationship of the second POI and a POI with lower heat degree may be deleted.

Figure 7:
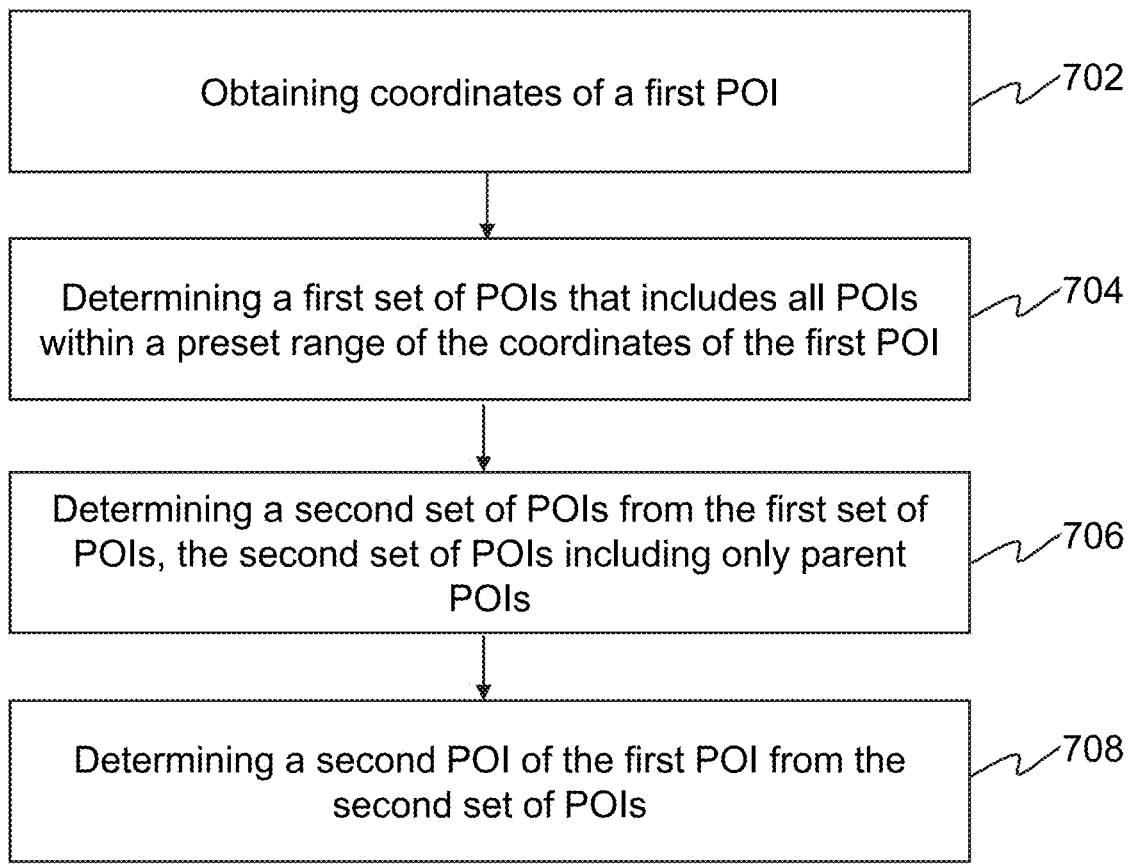
FIG. 7 is a flowchart illustrating an exemplary process for determining a second POI based on a generalizing portion of the first location name according to some embodiments of the present disclosure.

FIG. 7 is a flowchart illustrating an exemplary process 700 for determining a second POI based on a generalizing portion of the first location name according to some embodiments of the present disclosure. In some embodiments, step 610 of process 600 may be performed based on the process 700. The process 700 may be executed by the online to offline service system 100. For example, the process 700 may be implemented as a set of instructions (e.g., an application) stored in a storage device (e.g., the storage device 140). The processor 210 and/or the modules in FIG. 4 may execute the set of instructions and, when executing the instructions, the processor 210 and/or the units may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In step 702, the processing engine 112 (e.g., the parent-child relationship determination module 420) (e.g., the processing circuits 210-*b* of the processor 210) may obtain coordinates of a first POI. In some embodiments, the coordinates of the first POI may be denoted by longitude and latitude. The processing engine 112 may obtain the coordinates of the first POI from the user terminal 130, the storage device 140, the positioning system 150, the storage module 450, or any other external storage via the network 120. More descriptions of the first POI may be found elsewhere in the present disclosure (e.g., FIG. 6, and the descriptions thereof).

In step 704, the processing engine 112 (e.g., the parent-child relationship determination module 420) (e.g., the processing circuits 210-*b* of the processor 210) may determine a first set of POIs that includes all POIs within a preset range of the coordinates of the first POI. In some embodiments, the processing engine may determine the first set of POIs based on a K-dimensional Tree algorithm and the coordinates of the first POI. For example, the processing engine 112 may search for and determine POIs located within the preset range (e.g., 800 meters) from the first POI as the first set of POIs using the K-dimensional Tree algorithm. In some embodiments, the preset range may be default settings of the online to offline service system 100, or may be adjustable under different situations. For example, the preset range may be 1000 meters when the first POI is identified as a location inside a community. For another example, the preset range may be 150 meters when the first POI is identified as a location inside a subway station. As still another example, the preset range may be a constant (e.g., 500 meters).

In some embodiments, the first set of POIs may include one or more parent POIs, one or more child POIs, or the like, or any combination thereof. The one or more parent POIs may include a parent POI of the first POI and/or parent POIs without parent-child relationships associated with the first POI. The one or more child POIs may include child POIs associated with the same parent POI as the first POI and/or child POIs not associated with the same parent POI as the first POI. For example, the first set of POIs for the POI "Happy Community Subway Station Entrance C" may include two parent POIs "Happy Community" and "Happy Community Subway Station" and three child POIs "Happy Community East Gate", "Happy Community Subway Station Entrance A" and "Happy Community Subway Station Entrance B".

In step 706, the processing engine 112 (e.g., the parent-child relationship determination module 420) (e.g., the processing circuits 210-*b* of the processor 210) may determine a second set of POIs from the first set of POIs, the second set of POIs including only parent POIs relating to the first POI (also referred to as candidate parent POIs of the first POI as described in FIG. 6). The processing engine 112 may determine the second set of POIs based on specializing portions of location names of the first set of POIs. More descriptions of the specializing portion of a location name may be found elsewhere of the present disclosure (e.g., FIG. 6, and the descriptions thereof).

In some embodiments, the processing engine 112 may determine a specializing portion of a location name of each POI in the first set of POIs. The specializing portion of a location name of each POI in the first set of POIs may be compared with that of the location name of the first POI. A POI in the first set of POIs having a different specializing portion from the first POI may not be designated as a POI in the second set of POIs. For example, a location name of the first POI may be "Peace Gate Subway Station Entrance A". The specializing portion relating to the first POI may be "Entrance A. Then one POI in the first set of POIs having a specializing portion such as "Entrance B", "Entrance C", etc., may be removed from the first sets of POIs. The remaining POIs may be included in the second set of POIs.

In step 708, the processing engine 112 (e.g., the parent-child relationship determination unit 510 of the data acquisition module 410) (e.g., the processing circuits 210-*b* of the processor 210) may determine a second POI of the first POI from the second set of POIs. The processing engine 112 may determine the second POI based on location names of the second set of POIs and a generalizing portion of the first POI. More descriptions of the generalizing portion of the location name of the first POI may be found elsewhere in the present disclosure (e.g., FIG. 6, and the descriptions thereof).

In some embodiments, the processing engine 112 may determine the second POI by comparing location names of POIs in the second set of POIs to the generalizing portion of the first POI. Further, the processing engine 112 may determine a similarity between a location name of a POI in the second set of POIs and the generalizing portion of the location name of the first POI. If the similarity between the location name of a POI in the second set of POIs and the generalizing portion of the location name of the first POI is equal to or higher than a similarity threshold (e.g., 70%, 80%, 90%, 95%, 98%, etc.), the POI in the second set of POIs may be designated as the second POI. The similarity threshold may be default settings of the online to offline service system 100, or may be adjustable under different situations. For example, a location name of a POI in the second set of POIs may be "Peace Gate Subway Station". The generalizing portion of the location name of the first POI may be "Peace Gate Subway Station". The processing engine 112 may determine that a similarity between "Peace Gate Subway Station" and "Peace Gate Subway Station" is 100% and is greater than the similarity threshold (e.g., 98%). Then, the POI "Peace Gate Subway Station" may be designated as the second POI. As another example, a location name of a POI in the second set of POIs may be "Xuanwu Gate Subway Station". The generalizing portion of the location name of the first POI may be "Peace Gate Subway Station". The processing engine 112 may determine that a similarity between "Xuanwu Gate Subway Station" and "Peace Gate Subway Station" is about 75% and is lower than the similarity threshold (e.g., 98%). Then, the POI "Xuanwu Gate Subway Station" may not be designated as the second POI.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 700. In the storing step, the processing engine 112 may store the coordinates of the first POI, the specializing portion of the first location name, the generalizing portion of the first location name, the second POI, the specializing portions of location names of the first set of POIs, the generalizing portions of location names of the second set of POIs, the first set of POIs, and/or the second set of POIs in any storage device (e.g., the storage device 140) disclosed elsewhere in the present disclosure.

Figure 8:
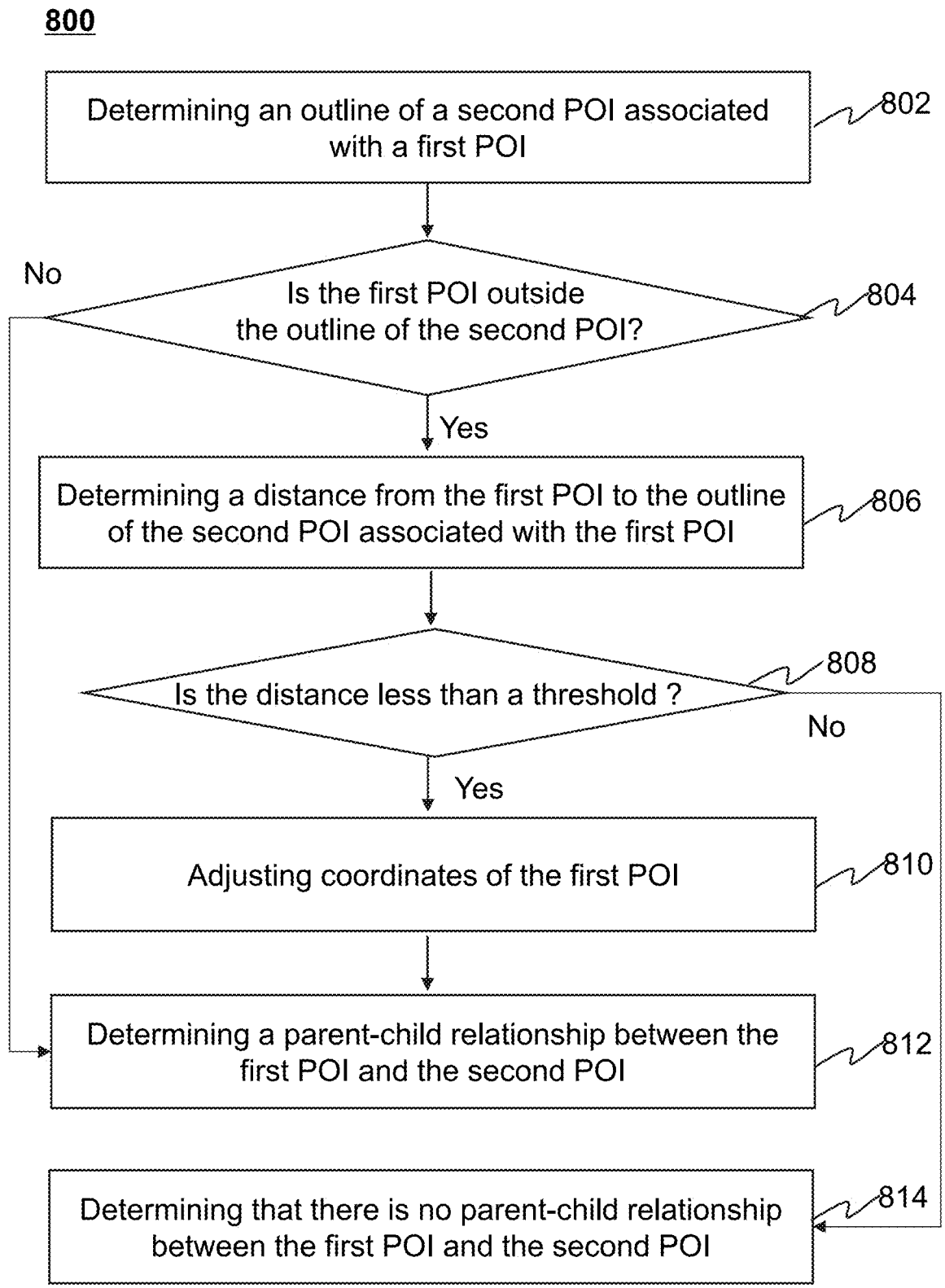
FIG. 8 is a flowchart illustrating an exemplary process for determining a parent-child relationship between a first POI and a second POI according to some embodiments of the present disclosure.

FIG. 8 is a flowchart illustrating an exemplary process 800 for determining a parent-child relationship between a first POI and a second POI according to some embodiments of the present disclosure. In some embodiments, step 612 of process 600 may be performed based on the process 800. The process 800 may be executed by the online to offline service system 100. For example, the process 800 may be implemented as a set of instructions (e.g., an application) stored in a storage device (e.g., the storage device 140). The processor 210 and/or the modules in FIG. 4 may execute the set of instructions and, when executing the instructions, the processor 210 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In step 802, the processing engine 112 (e.g., the child POI correction module 430) (e.g., the processing circuits 210-*b* of the processor 210) may determine an outline of a second POI associated with a first POI. As used herein, the first POI may refer to a child POI determined based on a first location name of the first POI (see, e.g., step 602 to step 608 and the description thereof). The second POI associated with a first POI may be a parent POI determined based on the first location name of the first POI (see, e.g., FIG. 7 and the description thereof). As used herein, an outline of a second POI may refer to the boundary of an area of the second POI in two-dimension. The outline of a second POI may be determined based on a map (e.g., AUTONAVI Map, GOOGLE Map, BAIDU Map, etc.) For example, the processing engine 112 may identify and/or determine the boundary of the area of the second POI on an electric map based on, for example, an image segmentation technology. Exemplary image segmentation technology may include a region-based segmentation algorithm, an edge-based segmentation algorithm, a threshold-based segmentation algorithm, etc. The outline of the second POI may be determined based on the boundary of the area of the second POI. For example, the outline of the second POI may be determined by connecting one or more coordinate points on the boundary of the area of the second POI. The outline may be a triangle, a square, a regular or irregular polygon, or the like, or any combination thereof.

In step 804, the processing engine 112 (e.g., the child POI correction module 430) (e.g., the processing circuits 210-b of the processor 210) may determine whether the first POI is outside the outline of the second POI. In some embodiments, the processing engine 112 may determine whether the first POI is outside the outline of the second POI based on coordinates of the first POI and the outline of the second POI using, for example, a ray casting technology, an area discriminant technology, an angle discriminant technology, or the like, or a combination thereof. For example, a ray casting technology may be applied to determine whether the first POI is outside the outline of the second POI via calculating a number of intersections of a ray emitted from the first POI through the outline of the second POI. Further, the processing engine 112 may draw a ray from a point representing the first POI towards the outline of the second POI. If the number of intersections between the ray emitted from the first POI and the outline of the second POI is an odd number, the processing engine 112 may determine that the first POI is inside the outline of the second POI. If the number of intersections between the ray emitted from the first POI and the outline of the second POI is an even number, the processing engine 112 may determine that the first POI is outside the outline of the second POI. As another example, an angle discriminant technology may be applied to determine whether the first POI is outside the outline of the second POI via calculating a sum of intersection angles between each two lines emitted from the first point to two points respectively on the outline of the second POI. If the sum of intersection angles is equal to 360 degrees, the processing engine 112 may determine that the first POI is inside the outline of the second POI. If the sum of intersection angles is unequal to 360 degrees, the processing engine 112 may determine that the first POI is outside the outline of the second POI.

In response to the determination that the first POI is inside the outline of the second POI, the processing engine may execute the process 800 to step 812 to determine a parent-child relationship between the first POI and the second POI. In response to the determination that the first POI is outside of the outline of the second POI, the processing engine 112 may execute the process 800 to step 806 to determine a distance from the first POI to the outline of the second POI associated with the first POI.

In step 806, the processing engine 112 (e.g., the child POI correction module 430) (e.g., the processing circuits 210-b of the processor 210) may determine a distance from the first POI to the outline of the second POI associated with the first POI. As used herein, the distance from the first POI to the outline of the second POI may be a distance between the point representing the first POI and a closest point on the boundary of the second POI. The distance from the first POI to the outline of the second POI may be determined based on, for example, a distance vector routing algorithm.

In step 808, the processing engine 112 (e.g., the child POI correction module 430) (e.g., the processing circuits 210-b of the processor 210) may determine whether the distance from the first POI to the outline of the second POI is less than a threshold. The threshold may be default settings of the online to offline service system 100, or may be adjustable under different situations. For example, the threshold may be 10 meters, 20 meters, 30 meters, 50 meters, 100 meters, etc.

In response to the determination that the distance from the first POI to the outline of the second POI is greater than or equal to the threshold, the processing engine 112 may execute the process 800 to step 814 to determine that there is no parent-child relationship between the first POI and the second POI. For example, the processing engine 112 may determine that the first POI is not a child POI of the second POI in response to that the distance from the first POI to the outline of the second POI is greater than the threshold (e.g., 50 meters). In response to the determination that the distance from the first POI to the outline of the second POI is less than the threshold, the processing engine 112 may execute the process 800 to step 810 to adjust the coordinates of the first POI.

In step 810, the processing engine 112 (e.g., the child POI correction module 430) (e.g., the processing circuits 210-b of the processor 210) may adjust the coordinates of the first POI. The processing engine 112 may adjust the coordinates of the first POI based on location information relating to the first POI from the storage device 140 or an external database (e.g., GPS, AUTONAVI Map, GOOGLE Map, BAIDU Map) via the network 120, wherein the adjusted first POI is inside the second POI. The location information relating to the first POI may include reference coordinates of the first POI denoted by a coordinate system (e.g., Mars coordinate system, GPS coordinate system, Baidu coordinate system, Google coordinate system, etc.), coordinate offset information, etc. In some embodiments, the coordinates of the first POI may be adjusted by comparing to reference coordinates of the first POI. In some embodiments, the coordinates of the first POI may be adjusted based on the coordinate offset information stored in an offset database provided by a developer.

In step 812, the processing engine 112 (e.g., the child POI correction module 430) (e.g., the processing circuits 210-b of the processor 210) may determine a parent-child relationship between the first POI and the second POI. The processing engine 112 may determine that the first POI is a child POI of the second POI and the second POI is a parent POI of the first POI.

In step 814, the processing engine 112 (e.g., the child POI correction module 430) (e.g., the processing circuits 210-b of the processor 210) may determine that there is no parent-child relationship between the first POI and the second POI.

The processing engine 112 may determine that the first POI is not a child POI of the second POI, nor the second POI a parent POI of the first POI.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 800. In the storing step, the processing engine 112 may store the coordinates of the first POI, the adjusted coordinates of the first POI, the distance from the first POI to the outline of the second POI, the third threshold, and/or the parent-child relationship between the first POI and the second POI in any storage device (e.g., the storage device 140) disclosed elsewhere in the present disclosure. In some embodiments, in the step 808, the distance may be compared based on a first threshold and a second threshold. For example, if the distance is less than the first threshold, the process 800 may proceed to perform the step 810. If the distance is greater than the first threshold, the process 800 may further include determining whether a difference between the distance and the first threshold is greater than the second threshold. If the difference between the distance and the first threshold is greater than the second threshold, the process 800 may proceed to perform the step 814. If the difference between the distance and the first threshold is less than the second threshold, the process 800 may proceed to perform the step 812. In some embodiment, the step 814 may be omitted. If it is determined that the distance is less than the threshold, the process 800 may proceed to perform step 812.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising: a non-transitory computer-readable storage medium storing executable instructions for determining parent-child relationships; and at least one processor in communication with the non-transitory computer-readable storage medium, when executing the executable instructions, the at least one processor is directed to:
obtain a first location name of a first point of interest (POI);
perform a word segmentation operation on the first location name to obtain a plurality of portions of the first location name;
determine a first portion from the plurality of portions by comparing to a first portion name database, the first portion indicating that the first POI is a child POI;
determine a second POI based on a second portion of the first location name, the second POI is-being a parent POI of the first POI, wherein to determine the second POI, the at least one processor is further directed to:
obtain coordinates of the first POI;
determine a first set of POIs that include all POIs within a preset range of the coordinates of the first POI;
determine a second set of POIs from the first set of POIs, the second set of POIs including only parent POIs; and
determine that the second POI is parent POI of the first POI by comparing the second portion of the first location name with each POI in the second set of POIs, wherein to compare the second portion of the first location name with each POI in the second set of POIs, the at least one processor is further directed to:
determine a similarity between the second portion of the first location name and each POI in the second set of POIs; and
determine whether the similarity between the second portion of the first location name and each POI in the second set of POIs is equal to or higher than a first threshold.

2. The system of claim 1, wherein the first location name is derived by pre-processing an input location name of the first POI.

3. The system of claim 1, wherein the at least one processor is further directed to:
determine a first parent-child relationship between the second POI and the first POI; and
store the first parent-child relationship between the second POI and the first POI.

4. The system of claim 1, wherein the at least one processor is further directed to:
obtain a third POI based on the second POI, wherein the third POI is a child POI of the second POI and a distance between the third POI and the first POI is lower than a second threshold;
compare the third POI and the first POI; and
determine a recommended POI between the third POI and the first POI based on the comparison.

5. The system of claim 4, wherein to compare the third POI and the first POI, the at least one processor is further directed to:
compare a heat degree of the third POI and that of the first POI, and
to determine the recommended POI, the at least one processor is further directed to:
designate one of the third POI and the first POI that has a higher heat degree as the recommended POI.

6. The system of claim 1, wherein the at least one processor is further directed to:
determine that coordinates of the first POI need to be adjusted based on the second POI; and
adjust the coordinates of the first POI.

7. The system of claim 6, wherein to determine that the coordinates of the first POI need to be adjusted, the at least one processor is further directed to:
determine an outline of the second POI;
compare the first POI and the outline of the second POI associated with the first POI; and
determine that the coordinates of the first POI need to be adjusted when a distance from the first POI to the outline of the second POI is equal to or smaller than a third threshold.

8. A method for improving an online to offline service, the method comprising:
obtaining a first location name of a first point of interest (POI);
performing a word segmentation operation on the first location name to obtain a plurality of portions of the first location name;
determining a first portion from the plurality of portions by comparing to a first portion name database, the first portion indicating that the first POI is a child POI;
determining a second POI based on a second portion of the first location name, the second POI is-being a parent POI of the first POI, wherein the determining the second POI further comprising:
obtaining coordinates of the first POI;
determining a first set of POIs that include all POIs within a preset range of the coordinates of the first POI;
determining a second set of POIs from the first set of POIs, the second set of POIs including only parent POIs; and
determining that the second POI is parent POI of the first POI by comparing the second portion of the first location name with each POI in the second set of POIs, wherein to compare the second portion of the first location name with each POI in the second set of POIs, the method further comprising:
determining a similarity between the second portion of the first location name and each POI in the second set of POIs; and
determining whether the similarity between the second portion of the first location name and each POI in the second set of POIs is equal to or higher than a first threshold.

9. The method of claim 8, wherein the first location name is derived by pre-processing an input location name of the first POI.

10. The method of claim 8, further comprising:
determining a first parent-child relationship between the second POI and the first POI; and
storing the first parent-child relationship between the second POI and the first POI.

11. The method of claim 8, further comprising:
obtaining a third POI based on the second POI, wherein the third POI is a child POI of the second POI and a distance between the third POI and the first POI is lower than a second threshold;
comparing the third POI and the first POI; and
determining a recommended POI between the third POI and the first POI based on the comparison.

12. The method of claim 11, wherein the comparing the third POI and the first POI includes comparing a heat degree of the third POI and that of the first POI, and the determining the recommended POI includes designating one of the third POI and the first POI that has a higher heat degree as the recommended POI.

13. The method of claim 8, further comprising:
   determining that coordinates of the first POI need to be adjusted based on the second POI; and
   adjusting the coordinates of the first POI.

14. The method of claim 13, wherein the determining that the coordinates of the first POI need to be adjusted, further includes:
   determining an outline of the second POI;
   comparing the first POI and the outline of the second POI associated with the first POI; and
   determining that the coordinates of the first POI need to be adjusted when a distance from the first POI to the outline of the second POI is equal to or smaller than a third threshold.

15. A non-transitory computer readable medium, comprising a set of instructions for determining parent-child relationships, wherein when executed by at least one processor, the set of instructions directs the at least one processor to:
   obtain a first location name of a first point of interest (POI);
   perform a word segmentation operation on the first location name to obtain a plurality of portions of the first location name;
   determine a first portion from the plurality of portions by comparing to a first portion name database, the first portion indicating that the first POI is a child POI;
   determine a second POI based on a second portion of the first location name and that, the second POI is-being a parent POI of the first POI wherein to determine the second POI, the set of instructions further directs the at least one processor to:
   obtain coordinates of the first POI;
   determine a first set of POIs that include all POIs within a preset range of the coordinates of the first POI;
   determine a second set of POIs from the first set of POIs, the second set of POIs including only parent POIs; and
   determine that the second POI is parent POI of the first POI by comparing the second portion of the first location name with each POI in the second set of POIs, wherein to compare the second portion of the first location name with each POI in the second set of POIs, the set of instructions further directs the at least one processor to:
   determine a similarity between the second portion of the first location name and each POI in the second set of POIs; and
   determine whether the similarity between the second portion of the first location name and each POI in the second set of POIs is equal to or higher than a first threshold.

* * * * *